(12) United States Patent
Mirkov

(10) Patent No.: US 10,189,030 B2
(45) Date of Patent: Jan. 29, 2019

(54) SHOWER HEAD WITH A TOROIDAL PULSATOR AND A MAGNETIC RING

(71) Applicant: FTT DOO, Belgrade (RS)

(72) Inventor: Branko Mirkov, Belgrade (RS)

(73) Assignee: FTT DOO (RS)

( * ) Notice: Subject to any disclaimer, the term of this patent is extended or adjusted under 35 U.S.C. 154(b) by 0 days.

(21) Appl. No.: 15/517,938

(22) PCT Filed: Oct. 12, 2015

(86) PCT No.: PCT/IB2015/001850
§ 371 (c)(1),
(2) Date: Apr. 7, 2017

(87) PCT Pub. No.: WO2016/059458
PCT Pub. Date: Apr. 21, 2016

(65) Prior Publication Data
US 2017/0239671 A1 Aug. 24, 2017

(30) Foreign Application Priority Data
Oct. 13, 2014 (RS) .................. P-2014/0549

(51) Int. Cl.
*B05B 1/18* (2006.01)
*B05B 1/08* (2006.01)
(Continued)

(52) U.S. Cl.
CPC ............. *B05B 1/083* (2013.01); *A61H 7/003* (2013.01); *A61H 33/6036* (2013.01); *B05B 1/18* (2013.01);
(Continued)

(58) Field of Classification Search
CPC ........... B05B 1/18; B05B 1/083; B05B 1/185; B05B 7/0425; A61H 33/6057; E03C 1/0409; E03C 1/084
(Continued)

(56) References Cited

U.S. PATENT DOCUMENTS 4,478,367 A    10/1984  Petursson
5,143,295 A *  9/1992   Okayama .................. B05B 1/34
                                                             239/403
(Continued)

FOREIGN PATENT DOCUMENTS

CN    203470251 U    3/2014
CN    202427572 U    9/2014
(Continued)

OTHER PUBLICATIONS

Database WPI, Week 199504, Thomson Scientific, London, GB, AN 1995-028982 XP002753958, -& RU 2011427 (Ostrikov M F)—Apr. 30, 1994.

*Primary Examiner* — Alexander M Valvis
(74) *Attorney, Agent, or Firm* — The Watson IP Group, PLC; Jovan N. Jovanovic; Vladan M. Vasiljevic

(57) ABSTRACT

The invention relates to a shower arm with a torus regulator and a magnetic ring that is comprised of a body (1) with a body head (25), a bell (2), a cover (3), a torus (4), a mixing element (5), a ring (6), a pin (7) and a barrier (9) on the cover, a barrier (8) and a nozzle (10) on the bell, a cavity (11) for water inlet, an inlet (12) of water into the shower head (25), a space (13), a gap (14) on the mixing element, a chamber (15), gaskets (16) and (17), a thread (18), a space (19) for directed flow, pins (20) and a groove (21) on the ring, a groove (22) on the bell, a thread (23) for connecting a hose, a support surface (24), a magnetic ring (26) and an output spray (27) of water and air. When the water circulates within the space (19) underneath the torus (4), negative
(Continued)

Figure 1:
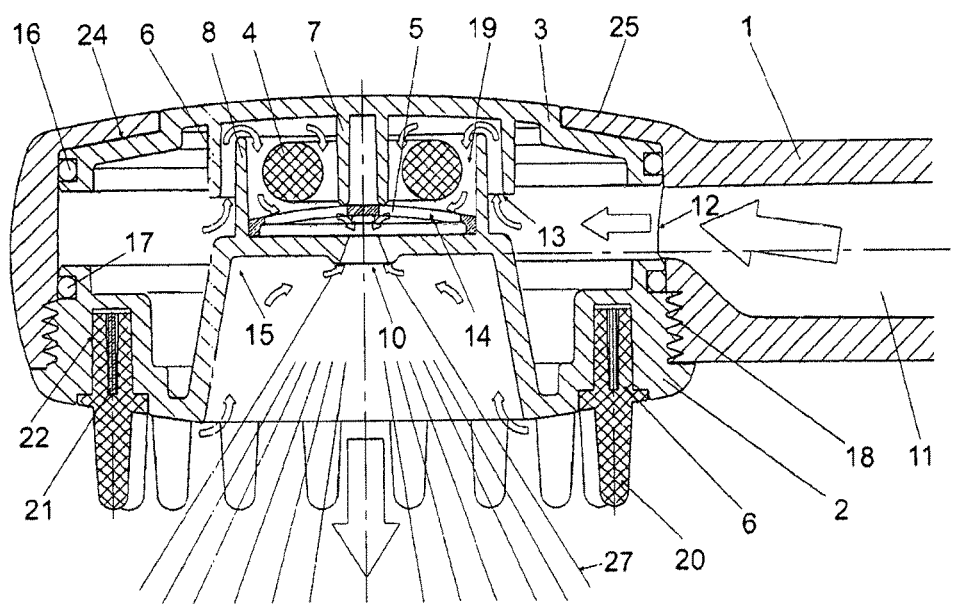

pressure—vacuum occurs from both the internal and the external sides of the torus cross-section that conditions suction of the air from the chamber (15) of the cone of the bell (2). This air is suctioned through the nozzle (10). In the space below the mixing element (5) the air and the water swirl which alternately enter into the air/water mixture and form a wide conical spray (27). The bell is provided with the groove (22), into which the ring (6) with pins (20) is tightly inserted. The pins are made from a soft material and serve for mechanical massage of the skin and the crown of the hair. On the other side in the ring there is the groove (21), into which the magnetic ring (26) is inserted. Its role is to normalize the water crystals and to arrange them into a natural shape. The nozzle (10) for spray outlet has an orifice large enough in order not to clog due to impurities in the water and limescale.

1 Claim, 5 Drawing Sheets

(51) Int. Cl.

| | | |
|---|---|---|
| *B05B 15/50* | (2018.01) | |
| *A61H 7/00* | (2006.01) | |
| *B05B 1/30* | (2006.01) | |
| *B05B 7/04* | (2006.01) | |
| *C02F 1/48* | (2006.01) | |
| *E03C 1/084* | (2006.01) | |
| *A61H 33/00* | (2006.01) | |
| *C02F 1/00* | (2006.01) | |
| *E03C 1/04* | (2006.01) | |
| *B05B 7/00* | (2006.01) | |

(52) U.S. Cl.
CPC .......... *B05B 1/3006* (2013.01); *B05B 7/0425* (2013.01); *B05B 15/50* (2018.02); *C02F 1/005* (2013.01); *C02F 1/482* (2013.01); *E03C 1/0409* (2013.01); *E03C 1/084* (2013.01); *A61H 2201/1692* (2013.01); *B05B 7/0056* (2013.01); *C02F 2307/06* (2013.01)

(58) Field of Classification Search
USPC ...................................................... 239/428.5
See application file for complete search history.

(56) References Cited

U.S. PATENT DOCUMENTS

| | | | | |
|---|---|---|---|---|
| 6,027,044 | A * | 2/2000 | Hirata | .................. B05B 1/3006 |
| | | | | 239/428.5 |
| 6,076,747 | A * | 6/2000 | Ming-Yuan | ........... B05B 1/1645 |
| | | | | 239/383 |
| 2013/0248621 | A1 * | 9/2013 | Huang | ...................... B05B 1/18 |
| | | | | 239/428.5 |
| 2014/0145010 | A1 | 5/2014 | Lin | |
| 2014/0306033 | A1 | 10/2014 | Qi | |
| 2015/0367355 | A1 * | 12/2015 | Komaki | .................. B05B 1/185 |
| | | | | 239/381 |

FOREIGN PATENT DOCUMENTS

| | | |
|---|---|---|
| DE | 20304568 | 5/2003 |
| DE | 102004027040 | 12/2005 |
| EP | 0595758 | 5/1994 |
| EP | 2778299 A1 | 9/2014 |
| FR | 1070363 | 7/1954 |
| JP | 2014133043 A | 7/2014 |
| RS | 49580 B | 4/2007 |
| RS | 37100 A1 | 12/2012 |
| RU | 2011427 | 4/1994 |
| WO | 9922875 | 5/1999 |
| WO | 2010097756 A1 | 9/2010 |
| WO | 2015018330 A1 | 8/2014 |

* cited by examiner ial pulsator and a magnetic ring

FIELD OF INVENTION

The invention belongs to the field of spraying apparatus and is classified into Class B 05B 1/08 of the International Classification referring to nozzles for pulsating delivery of a liquid or delivery by flow interruption. Nozzles adapted to create a full spray are classified into Class B 05B 1102.

TECHNICAL PROBLEM

The technical problem which is solved by the present invention is how to obtain a full and sufficiently wide spray of showering water at a low pressure in the installation. Moreover, a solution to reducing the quantity of water used at a flow for showering needs to be found. By mixing water and air for the formation of a spray a considerable reduction in water consumption is reached. The technical problem further includes a solution to mechanical needs, such as skin rubbing and hair combing while shampooing and rinsing during showering. Finally, the technical problem also includes improvement in water quality that is achieved by a process of water activation or water crystal naturalization and elimination of several harmful substances.

PRIOR ART

Showering devices in the form of arms connected to a hose are known. They usually have several types of spray shape of the delivered water, from a gentle thin spray through a huge number of small holes to burst sprays for hydro massage. By rotating a disk-shaped sieve a desired spray is selected by covering orifices. A water/air mixing device through chambers is widely known and bears U.S. Pat. No. 5,381,957. The water enters through a cone and passes through a nozzle at the end, where the flow is stopped by increasing pressure. This is a compression chamber. The mixing chamber is shaped like an open cone with an increased cross-section in direction of the flow. The water hits against a barrier provided with a plurality of circumferential orifices. Here, a return spray occurs that suctions air. Part of the delivered water forms a showering spray. The process of water/air mixing rapidly repeats. A dispersed spray of water and air is obtained at the outlet from the shower.

GIST OF THE INVENTION

A shower arm with a torus regulator and a magnetic ring is comprised of an arm body, wherein a cylindrical part serves as a holder for holding, and of a barrel-shaped head, in which a torus is arranged. The torus is arranged between a cover on the upper side and a bell on the bottom side. A ring with massaging pins is arranged in a corresponding groove on the bell. On the ring which is provided with pins on its bottom side a groove is arranged on the upper side, into which groove a magnetic ring is arranged. A mixing element with radial cut-outs is arranged underneath the torus and located above the nozzle for water outlet. The gist of the invention is the arrangement of grooves in the shower head on the cover and on the bell, between which a torus with a mixing element is arranged. A further gist of the invention is a ring with pins for mechanical massage and a magnetic ring that has influence on shaping a natural shape of water crystals. The magnetic ring is arranged outside of the water in a space on the external bottom side of the bell in the groove containing the ring with pins. The mixing of water and air contributes to a reduced water flow when the spray is perfectly shaped. A scattered spray is obtained if there is low pressure in water pipelines. The water is delivered through one conical nozzle with a sufficiently large diameter to avoid clogging due to limescale accumulation.

SHORT DESCRIPTION OF FIGURES

Figure 3:
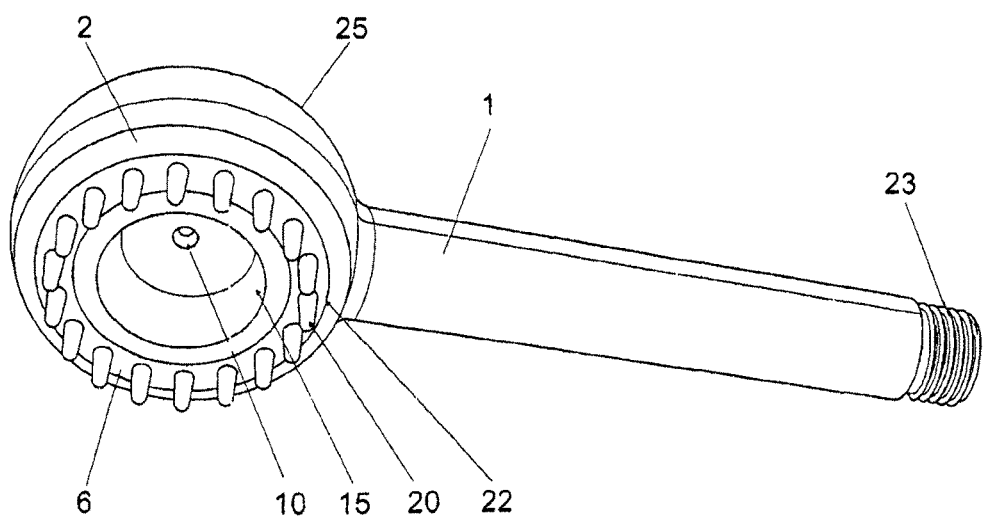
Figure 4:
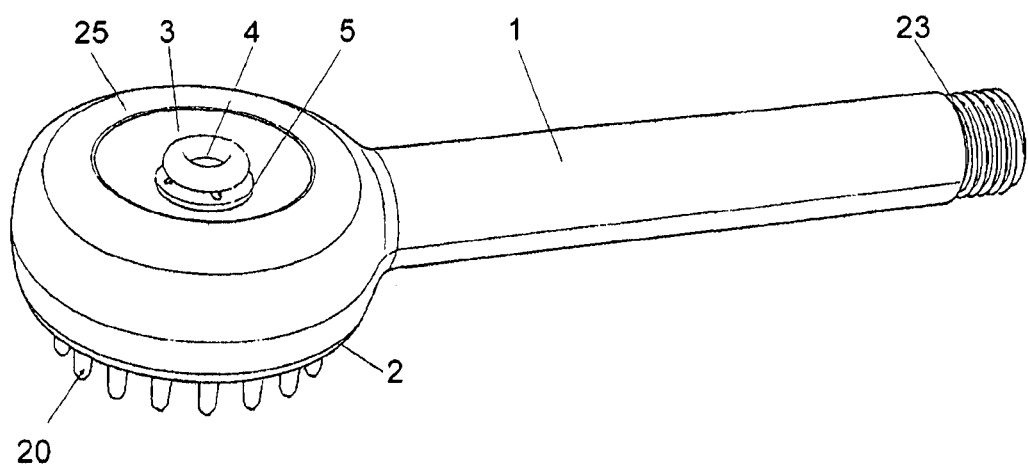
Figure 5:
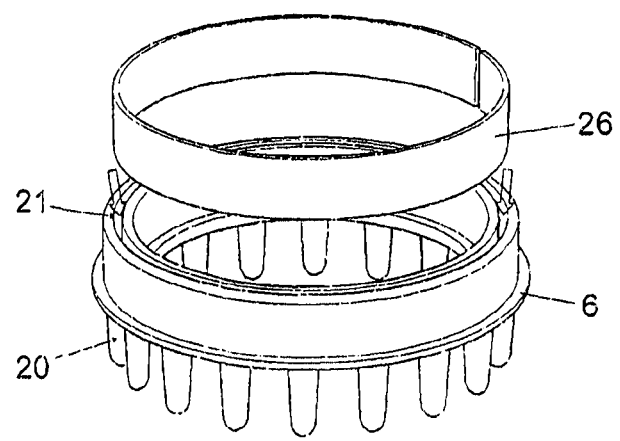

The invention is described in more detail by way of an embodiment and the enclosed drawings representing in:
FIG. 1 a head detail in longitudinal cross-section of a shower arm of the invention,
FIG. 2 an axonometric view of the cross-section from FIG. 1 of the entire shower arm,
FIG. 3 an axonometric view of the bottom side of the shower arm,
FIG. 4 an axonometric view of the upper side of the shower arm, and
FIG. 5 a spatial detail of a ring with pins, into which a magnetic ring is arranged.

DETAILED DESCRIPTION OF THE INVENTION

Figure 2:
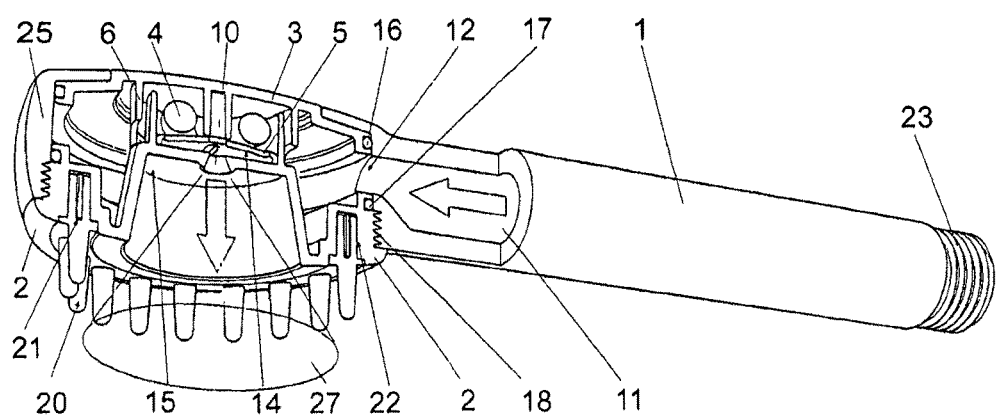

A shower arm with a torus regulator and a magnetic ring of the invention, FIGS. 1 and 2, is comprised of the following parts:
a cylindrical part serving as a holder is a body of a shower 1, a bell 2, a cover 3, a torus 4, a mixing element 5, a ring with pins 6, a central pin 7, an annular rib on the bell 8, an annular rib on the cover 9, an outlet nozzle 10, a cylindrical tunnel for water inlet 11, a narrowed water inlet into the shower head 12, a space for passage of water of an external flow 13, a cut-out on the mixing element 5, a conical chamber 15, a cover gasket 16, a bell gasket 17, a thread 18 for connecting the bell with the body of the arm, an outlet water spray 19, a pin 20, an internal groove 21, a groove 22 on the bell for the ring with pins and a conventional thread 23 for connecting a hose for water inlet from the pipeline via a mixer tap. On FIGS. 3 and 4, reference number 25 shows a body head of the shower arm 1, on FIG. 5 reference number 26 shows a magnetic ring that is inserted into the groove 21 of the ring 6 with pins 20.

Once the shower arm 1 is connected to a hose by way of a conventional thread 23, water under pressure flows from the pipeline through the opening 11 and enters through the passage 12 into the space of the shower head 25. The annular barrier 9, which is part of the cover 3, and the annular rib 8 form the groove 13, through which the water enters a space 19, in which the torus 4 and the mixing element 5 are arranged. The torus is a ring of a circular cross-section but can also be of an elliptical cross-section. In the centre of the torus there is a barrier in the form of a small tower 7 whose function is double, namely to push the mixing element 5 in the assembly and to shape the internal water flow next to the torus. The water which penetrates through the space 19 hits against the mixing element 5. Since continuity is interrupted and negative pressure occurs under the torus, the air is suctioned from the outside towards the interior through the nozzle 10. A spray 27 in the form of a wide cone has a mixed water/air composition.

The regulating property of the torus depends on its position. When it is lifted upwards towards the cover, the spray is soft and wide, when it is lowered towards the mixing element, the spray is strong and falls at an acute angle and provides an effect suitable for a massage and gives a feeling of a rapid mixing of water and air. This results in a favourably reduced water consumption as the spray for showering is shaped at a lower pressure in the installation and also at a reduced flow of water per minute. The bell 2 with the thread 18 presses the body 1. The gasket 17 is arranged upstream of the thread and prevents the pressurized water from flowing into the thread area. The bell is formed by the conical chamber 15 with the nozzle 10 and the groove 22 for receiving the ring 6. The ring 6 is provided on its bottom side with a plurality of circumferentially arranged pins 20. The pins 20 can be flexible, made from a soft material, thin or thick, long or short. If they are thin, they can be doubled to provide for a more gentle massage. The pins are provided to allow mechanical massage of the skin or the hair. Their height presents a distance of the water spray from the skin during showering. On the upper side of the ring 6 there is the groove 21, into which the magnetic ring is arranged. The role of the magnetic ring is to transfer the chemical shape of the water to a natural shape with a well arranged structure of crystals. The ring 26 is made of a strip of a fabricated flexible thin magnetic material. It is rolled circumferentially and inserted into the groove 21, then it is inserted into the groove 22 on the bell 2 together with the ring 6.

Such construction provides for the fact that the magnetic strip rolled into the ring 26 is not in direct contact with the water spray but is hermetically arranged in the groove 22, into which the showering water does not penetrate.

MODE FOR CARRYING OUT THE INVENTION

The shower arm with the torus regulator and the magnetic ring is used for showering, bathing and water massage. It not only offers water massage but also mechanical massage through the ring with pins. It is connected to a hose of conventional dimensions such as R ½". It is suitable for systems with low pressure in the installation and for rational water consumption. It is best if the arm is made by injection moulding. A suitable material is ABS plastic for the body 1, the bell 2 and the mixing element 5. The cover 3 is foreseen to be transparent, so PC polycarbonate plastic is recommended. It can also be made from ABS plastic in the same colour as the arm body. The ring 6 with pins is from an elastomer having a hardness from 50 to 70 Sh (shore). A polyurethane based elastomer is more suitable. It is foreseen that the torus 4 is produced from an elastomer the same as the ring 6. The surfaces can be smooth/polished which is favourable in sanitary devices that come in contact with water, since they accumulate less limescale. The gasket 16 on the cover and the gasket 17 on the bell can be the same. They are ordered as conventional fabricated parts from renowned manufacturers of PTFE materials without harmful effects on the health. The hose is also a fabricated product that is delivered with a thread for connecting to the shower arm.

The invention claimed is:

1. A shower arm connected to a hose by way of a thread, comprising:
    a body within a shower head including a cover; and
    a bell arranged from a bottom side of the shower arm that is connected through a thread with the body, inside of which a chamber includes a torus that moves towards and away from the cover to regulate a pressure and width of a spray of the shower arm, the torus being arranged above a nozzle within the bell, wherein during showering air is suctioned from the chamber through the nozzle and swirled with water to form the spray that exits the bell through the nozzle;
    a groove, within the bell, arranged from a bottom side of the bell, into which a ring is provided with circumferentially arranged pins are inserted; and
    another groove arranged on the ring of circumferentially arranged pins from the upper side thereof, into which a magnetic ring made of a strip of a rolled flexible material is circumferentially inserted.

* * * * *